(12) United States Patent
O'Connell et al.

(10) Patent No.: US 12,528,365 B2
(45) Date of Patent: Jan. 20, 2026

(54) POWER OPTIMIZATION SYSTEM AND METHOD

(71) Applicant: EATON INTELLIGENT POWER LIMITED, Dublin (IE)

(72) Inventors: Julia O'Connell, Dublin (IE); Colm Gallagher, Dublin (IE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 132 days.

(21) Appl. No.: 18/566,448

(22) PCT Filed: Jun. 2, 2021

(86) PCT No.: PCT/EP2021/064868
§ 371 (c)(1),
(2) Date: Dec. 1, 2023

(87) PCT Pub. No.: WO2022/253432
PCT Pub. Date: Dec. 8, 2022

(65) Prior Publication Data
US 2024/0270089 A1  Aug. 15, 2024

(51) Int. Cl.
*B60L 15/20* (2006.01)

(52) U.S. Cl.
CPC ..... *B60L 15/2045* (2013.01); *B60L 2240/486* (2013.01); *B60L 2240/647* (2013.01); *B60L 2240/66* (2013.01); *B60L 2240/68* (2013.01)

(58) Field of Classification Search
None
See application file for complete search history.

(56) References Cited

U.S. PATENT DOCUMENTS

| 8,364,389 B2 * | 1/2013 | Dorogusker | B62J 45/20 |
| | | | 702/182 |
| 9,194,955 B1 * | 11/2015 | Fahrner | G01S 19/16 |
| 2017/0225742 A1 | 8/2017 | Hancock et al. | |
| 2018/0082585 A1 | 3/2018 | Zhang et al. | |

* cited by examiner

*Primary Examiner* — Justin S Lee
(74) *Attorney, Agent, or Firm* — LEYDIG, VOIT & MAYER, LTD.

(57) ABSTRACT

A micro-mobility vehicle power optimization system generating and applying a set of optimal characteristics. The system comprises a processor. The processor is operable to carry out the steps of: receiving, from an input from a user of the micro-mobility vehicle, an objective parameter; recognising, from the micro-mobility vehicle, a set of input devices; determining, from the set of input devices, a set of input device data points; storing, on a datastore, the set of input device data points; determining the set of optimal characteristics; applying, to the set of input devices, the optimal characteristics, thereby optimizing the power parameters of the set of input devices of the micro-mobility vehicle. The optimal characteristics are determined based on: the objective parameter; and the set of input device data points.

19 Claims, 4 Drawing Sheets

POWER OPTIMIZATION SYSTEM AND METHOD

FIELD OF THE DISCLOSURE

The present disclosure relates to a micro-mobility vehicle power optimization system and method and finds particular, although not exclusive, utility in a system and method for providing a user with optimal power source utilization.

BACKGROUND TO THE DISCLOSURE

Micro-mobility vehicles are a range of small, lightweight vehicles operating at speeds typically below 25 km/h (15 mph) that are driven by users personally. Micro-mobility devices include electric bikes, electric scooters, electric skateboards, shared bicycles, and electric pedal assisted (pedelec) bicycles.

Micro-mobility vehicles currently have two or more modes of operation: electrical power or human bio-mechanical power. When the electrical power is off, or a power source of the micro-mobility vehicle has been expended, the user must rely bio-mechanical power in order to move the vehicle. The use of power in this manner is both inefficient and a jarring user experience.

Optimizing the power consumption in these hybrid micro-mobility vehicles is necessary to maximize the efficiency of the power sources. In the case of micro-mobility vehicles, these power sources are humans (i.e. the user of the micro-mobility vehicle) and electricity (i.e. from a battery). Presently, it is at the user's discretion as to when the electrically assisted operation mode is engaged. This decision is based on individual user preferences. However, there is no system for automating/informing the activation of each power source based on a user defined objective.

Therefore, it desirable to provide a power optimization system and method capable of optimizing and controlling the electrical power source and informing the user on how to achieve the optimal performance.

SUMMARY OF THE DISCLOSURE

According to a first aspect of the present disclosure, there is provided a micro-mobility vehicle power optimization system generating and applying a set of optimal characteristics, the system comprising a processor operable to carry out the steps of: receiving, from an input from a user of the micro-mobility vehicle, an objective parameter; recognising, from the micro-mobility vehicle, a set of input devices; determining, from the set of input devices, a set of input device data points; storing, on a datastore, the set of input device data points; determining the set of optimal characteristics based on: the objective parameter; and the set of input device data points; and applying, to the set of input devices, the optimal characteristics, thereby optimizing the power parameters of the set of input devices of the micro-mobility vehicle.

The term 'micro-mobility vehicle' will be understood here by the skilled addressee as being any vehicle having two modes of operation, namely electrical power or human bio-mechanical power. For example, the micro-mobility vehicle may be an electric bike. Alternatively, the micro-mobility vehicle may be an electric scooter, and electric skateboard, or any other suitable vehicle having two modes of operation.

The term 'optimal characteristics' will be understood by the skilled addressee as being optimal operating settings for the micro-mobility vehicle. The optimal characteristic may be an optimal scenario in which a battery may provide power to a pedal system of an electric bicycle. For example, an optimal scenario may be when a user of an electric bicycle is pedalling uphill. Alternatively, the optimal characteristic may be an optimal power at which the battery provides power to the pedal system of the electric bike. In this way, different hill gradients may have different corresponding optimal powers.

A key advantage of the present disclosure is that the system may provide a user with a set of objectives to choose from and may subsequently control the electrical power source utilization of the micro-mobility vehicle in order to achieve optimal performance of the micro-mobility vehicle. Further advantageously, the present disclosure may provide a user with feedback related to how to achieve optimal performance of the micro-mobility vehicle.

Preferably, the datastore further comprises a set of predetermined optimal characteristics. In this way, a manufacturer or a user of the micro-mobility vehicle may provide a set of optimal characteristics that have been previously determined, for example during previous testing and training. The predetermined optimal characteristics may preferably comprise historic optimal characteristics. In this way, optimal characteristics that have been generated during previous uses of the present disclosure may be stored. Advantageously, the predetermined optimal characteristics may provide the system with an improved means of determining the optimal characteristics of the present use of the disclosure. Further, if the predetermined optimal characteristics were previously determined based on the same, or similar, objective parameter, and input device data points, then the system may provide the user with optimal characteristics whilst using minimal computational resources.

Preferably, the set of optimal characteristics is determined by: selecting an optimization function based on the objective parameter; determining an uncontrollable parameter; executing the optimization function; and optimizing the optimization function, thereby outputting the set of optimal characteristics. The optimization function is preferably based on: the objective parameter, the uncontrollable parameter, and the set of input device metrics.

Preferably, the optimization function is a cost function and the cost function is optimized by minimizing the cost function. Advantageously, the set of optimal characteristics may advantageously be based on a range of different factors that may influence the operation of the micro-mobility vehicle. Minimizing the optimization function advantageously provides a set of optimal characteristics which are influenced by the range of different factors.

Preferably, the objective parameter is one or more selected from the range of: a maximum battery capacity depletion; a minimum journey time; a maximum heart-rate; a minimum battery drain; a target heart rate; a target maximum speed; and a minimum bio-mechanical power input. Advantageously, the user of the micro-mobility vehicle may select an objective parameter based on their current goal and/or situation. For example, if a user of the micro-mobility vehicle wishes to use the micro-mobility vehicle in a fitness context, they may select the target heart rate objective parameter. Alternatively, if the user wishes to reach a destination urgently, they may select the minimum journey time objective parameter.

The uncontrollable parameter may be user unspecified. That is, the uncontrollable parameters may be parameters that are outside the control of the user and/or the system. Preferably, the uncontrollable parameter is one more selected from the range of: a wind resistance opposing the motion of the user; a weight of the user; a road surface material; a traffic condition; a weather condition; and a traffic light status. In this way, the uncontrollable parameter may be, for example, an environmental parameter outside of the control of the system and may be taken into account when determining the set of optimal characteristics. Disregarding the uncontrollable parameter may lead to an optimal characteristic that is not optimal.

Preferably, the datastore further comprises: a historic objective parameter having an objective parameter timestamp; a historic uncontrollable parameter having an uncontrollable parameter timestamp; a historic input device data point having an input device data point timestamp; and a historic optimal characteristic having an optimal characteristic timestamp; wherein the objective parameter timestamp, the uncontrollable parameter timestamp and the optimal characteristic timestamp are the same, indicating that they correspond to the same historic activity. In this way, optimal characteristics that have previously been generated based on previously selected objective parameters, previously determined uncontrollable parameters, and previously determined input device data points, may be stored on the datastore. Said parameters may be linked within the datastore by the timestamp associated with the parameter. That is, parameters having the same time stamp may be determined as corresponding to a particular session. In some embodiments, the set of optimal characteristics is determined by: determining that the uncontrollable parameter matches the historic uncontrollable parameter; determining that the objective parameter matches the historic objective parameter; and outputting the optimal characteristic as the historic optimal characteristic. In this way, the system may determine that the parameters of the present session have previously been implemented in a previous session. Advantageously, the system may save computational resources and/or time by applying the optimal characteristics that were applied is said previous session. As more sessions are completed, this datastore of historic parameters may increase in size and the likelihood of the present session matching a previous session may in turn increase over time.

Preferably, the set of input devices comprises one or more selected from the range of: a battery; a power meter; and a speed meter. In this way, the processor may determine that the micro-mobility vehicle comprises the battery, the power meter and the speed meter.

The battery may be a lithium-ion battery. Alternatively, the battery may be any battery suitable for use in a micro-mobility vehicle. The battery may be a secondary (i.e. rechargeable) battery. The battery may comprise an array of batteries.

Preferably, the set of input device metrics comprises: a state of charge of the battery; a bio-mechanical power input of the user; and a speed of the micro-mobility vehicle; wherein the bio-mechanical power input is determined from the power meter; and wherein the speed is determined from the speed meter. In this way, the processor may determine a level of charge of the battery relative to a capacity of the battery. The processor may also determine a magnitude of power that is provided by the user of the micro-mobility vehicle.

In order to determine the state of charge of the battery, the processor is preferably operatively connected to an analogue-to-digital convertor (ADC) driver, which is in turn operatively connected to the battery. The ADC driver preferably measures an analogue voltage signal of the battery and converts it into a digital voltage signal. The processor may then determine the state of charge of the battery based on the digital voltage signal. Alternatively, the processor may be operatively connected to any one or more of: a voltmeter; an ammeter; and a hydrometer. Accordingly, the state of charge of the battery may be determined using one or more methods known by the skilled addressee. For example, the state of charge may also be determined using one or more of: a chemical method; a voltage method; a current integration method; Kalman filtering; and a pressure method.

The set of input device metrics may further comprise a state of health of the battery. The state of health of the battery may indicate a condition of the battery relative to its ideal conditions. The state of health of the battery may degrade over time. The state of health may be evaluated using one or more of: an internal resistance; a capacity; a voltage; a self-discharge of the battery; an ability to accept a charge; a number of charge-discharge cycles; an age of the battery; a temperature of battery during its previous uses; and a total energy charged and discharged.

The set of input devices may further comprise one or more selected from the range of: a gear input device; a cadence meter; an air flow meter; and a heart rate monitor. Advantageously, the optimization method may receive a higher number of inputs, thereby increasing an accuracy of the optimal characteristics. Further advantageously, a user may be provided with fitness and/or health related benefits as they may be provided with real-time information regarding their gear, cadence and/or speed. The set of input devices may also comprise a magnetometer The gear input device may be an electric gear system of an electric bike or any other micro-mobility vehicle having an electric gear system. The electric gear may comprise an electric motor configured to switch between gear settings of the electric gear system. The cadence meter may be configured to measure a cadence of a pedal of an electric bicycle. The cadence represents a number of revolutions per unit time the pedal undergoes. The air flow meter may be configured to measure a mass of air flowing through the air flow meter per unit time. The magnetometer may be configured to measure a direction of the Earth's magnetic field in order to determine a direction of the micro-mobility vehicle.

Accordingly, the set of input device metrics preferably further comprises: a gear state of the electronic gear; a cadence; and an air flow; wherein the cadence is determined from the cadence meter; and wherein the air flow is determined from the air flow meter. These input metrics may advantageously provide an explicit value for the respective metric, without which the metric would need to be inferred. Furthermore, the input metrics may advantageously be used to more accurately determine a speed of the micro-mobility vehicle and an incline and/or road gradient.

Preferably, the system further comprises a clock. Further preferably, the set of input device metrics comprise a clock time. In this way, the optimal characteristic determination process may be a real-time process. Preferably, the datastore is a time-series datastore. Further preferably, the elements of the datastore comprise corresponding time stamps indicative of when they were measured and/or determined.

In some embodiments, the processor may be further operable to cause for display on an indication device, the optimal characteristics on a feedback device of the micro-mobility vehicle. This may be particularly useful in the situation that an optimal characteristic may only be controlled by the user. For example, if the optimal characteristic was a certain level of bio-mechanical power input, the user may be made aware of said input via the feedback device.

In accordance with a second aspect of the present disclosure, there is provided a method for generating and applying a set of optimal characteristics, the method comprising: receiving, by a processor, from an input from a user of the micro-mobility vehicle, an objective parameter; recognising, by the processor, from the micro-mobility vehicle, a set of input devices; determining, by the processor, from the set of input devices, a set of input device data points; storing, by the processor, on a datastore comprising a set of predetermined metrics, the set of input device data points; determining, by the processor, the set of optimal characteristics based on: the objective parameter; and the set of input device data points; and applying, by the processor, to the set of input devices, the optimal characteristics, thereby optimizing the power parameters of the set of input devices of the micro-mobility vehicle.

The set of optimal characteristics is preferably determined by: selecting, by the processor, an optimization function based on the objective parameter; determining, by the processor, an uncontrollable parameter; executing, by the processor, the optimization function; optimizing, by the processor, the optimization function, thereby outputting the set of optimal characteristics; wherein the optimization function is based on: the objective parameter; the uncontrollable parameter; and the set of input device metrics.

The uncontrollable parameter is preferably one or more selected from the range of: a wind resistance opposing the motion of the user; a weight of the user; a road surface material; a traffic condition; a weather condition; and a traffic light status.

The set of input devices preferably comprises one or more selected from the range of: a battery; a power meter; a speed meter; and preferably a gear input device; a cadence meter; and an air flow meter The objective parameter is preferably one or more selected from the range of: a maximum battery capacity depletion; a minimum journey time; a maximum heart-rate; a minimum battery drain; a target heart rate; a target maximum speed; and a minimum bio-mechanical power input.

Preferably, the set of input device metrics comprises one or more selected from the range of: a state of charge held in the battery; a bio-mechanical power input of the user; and preferably a speed of the micro-mobility vehicle; a gear state of the electronic gear; a cadence; and an air flow; wherein the bio-mechanical power input is determined from the power meter; wherein the speed is determined from the speed meter; wherein the cadence is determined from the cadence meter; and wherein the air flow is determined from the air flow meter.

The method may include each or every step carried out during operation of the processor of the first aspect. Accordingly, each feature of the first aspect may be included in the second aspect of the present disclosure.

DETAILED DESCRIPTION

Figure 1:
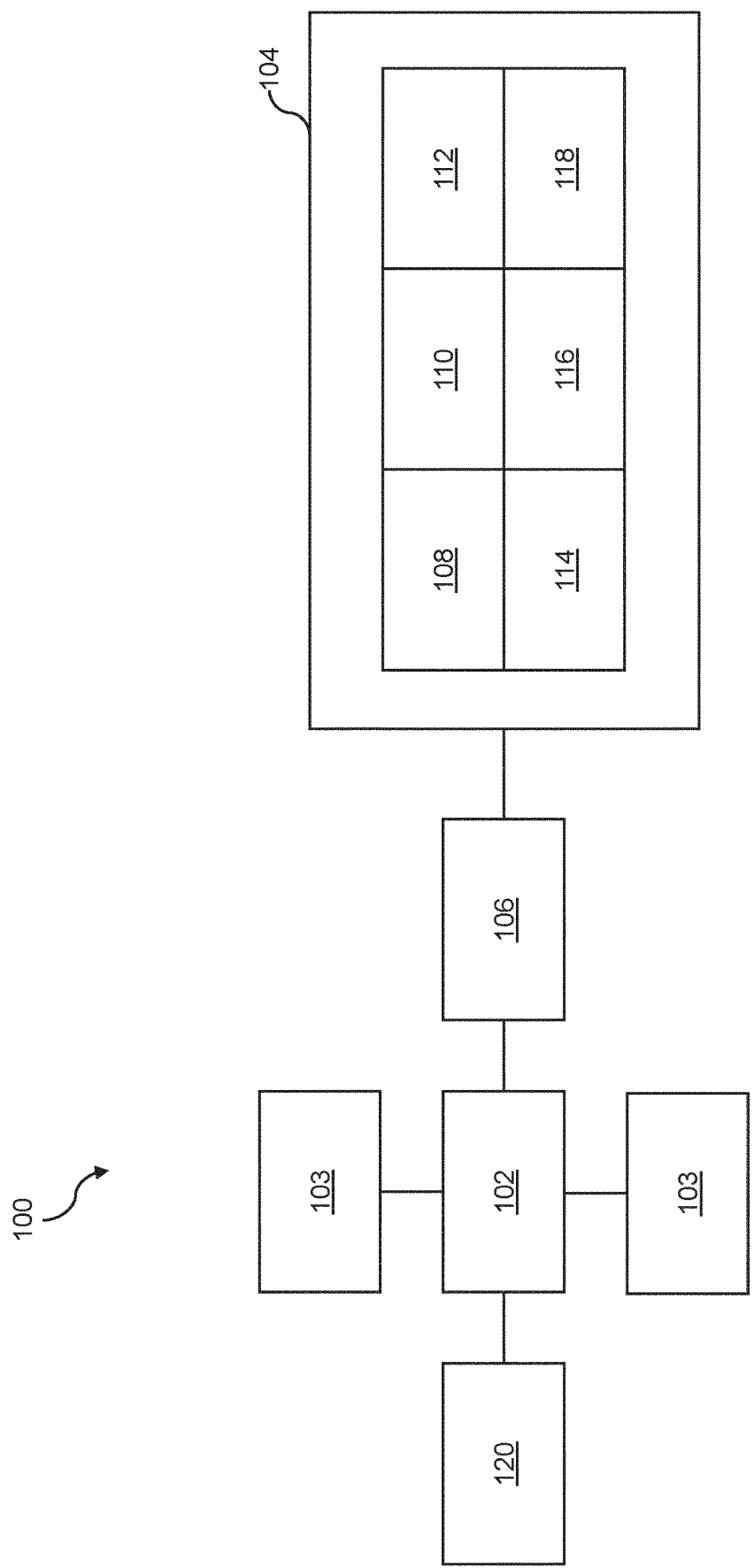
FIG. 1 is a schematic view of a power optimization system.

FIG. 1 is a schematic view of a power optimization system 100. The power optimization system includes a processor 102 comprising a clock 103. The processor is in communication with a cloud based server 104 via a smart device 106. The processor 102 is wirelessly connected to the smart device 106. The smart device is a smart phone. Accordingly, the processor 102 and smart device 106 communicate wirelessly via Bluetooth. The power optimization system 100 further comprises a voltmeter 120 configured to measure a voltage of an external device and an electrometer 130 configured to measure an electrical charge of an external device. As will be discussed further in relation to FIG. 2, the external device is a battery.

The cloud based server 104 comprises a battery datastore 108, a power datastore 110, a speed datastore 112, a gear datastore 114, a cadence datastore 116, and an optimization datastore 118. The battery datastore 114 comprises historic battery data. The power datastore 110 comprises historic power data. The speed datastore 112 comprises historic speed data. The gear datastore 114 comprises historic gear data. The cadence datastore 116 comprises historic cadence data. The optimization datastore 118 comprises historic optimization data. The historic optimization data includes a historic set of uncontrollable parameters, a historic objective parameter, and a historic set of optimal characteristics. Each of these historic parameters are linked by a clock time indicative of the time at which they were determined and/or measured.

Figure 2:
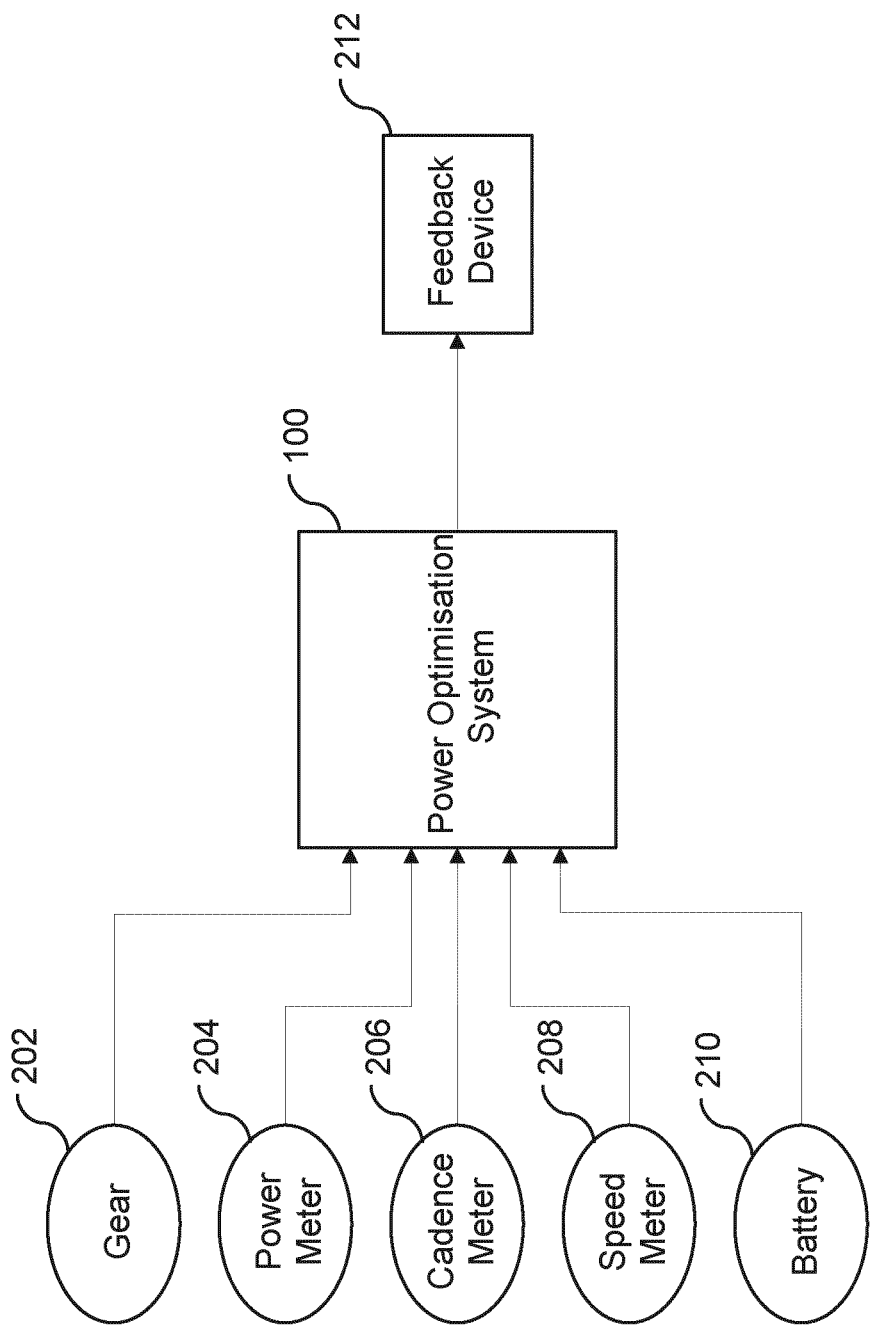
FIG. 2 is a schematic view of an electric bicycle for use with the power optimization system of FIG. 1.

Turning now to FIG. 2, there is shown a schematic view of an electric bicycle 200 for use with the power optimization system 100 of FIG. 1.

The electric bicycle 200 is a generic electric bicycle and will be well known to the skilled addressee. The electric bicycle 200 comprises a gear 202, a power meter 204, a cadence meter 206, a speed meter 208, a battery 210, a feedback device 212, and a motor 214, all of which are in communication with the power optimization system 100.

The gear 202 is configured to convert a cadence of a pedal (not shown) of a pair of pedals of the electric bicycle 200 to a speed of the electric bicycle 200. The cadence of the pedal is influenced by a user of the electric bicycle 200. The gear 202 is an electric gear 202. The gear 202 comprises a gear processor (not shown) configured to transmit a signal to a gear motor (not shown), causing the gear motor to shift between a first gear setting and a second gear setting. The gear processor also determines the current gear setting of the gear 202.

Additionally, an electric motor (not shown) increases the speed of the electric bicycle 200 by increasing the rotational speed of a wheel.

The power meter 204 is configured to measure a bio-mechanical power input of the user. That is, the power meter 204 measures a magnitude of power provided to the electric bicycle 200 by the user. The bio-mechanic power is provided by the user via the pedals. The power meter 204 is a strain gauge that measures a torque applied at the pedals. Accordingly, when the torque is combined with angular velocity, a power is calculated. A higher bio-mechanical power input will lead to a higher speed of the electric bicycle 200.

The cadence meter 206 is configured to measure a cadence of the pedals of the electric bicycle 200. The cadence represents the number of revolutions per unit time each of the pedals undergoes. The cadence meter 206 comprises a magnet portion and a measurement portion. The magnet portion is placed on a pedal at a radial position from a base of the pedal. The measurement portion is placed on a frame of the electric bicycle 200 such that the measurement portion is aligned with the magnet portion once every rotation. The measurement portion determines a rotation period for a rotation of the pedal. The rotation period is then converted into a cadence value by dividing the unit time by the rotation period. Accordingly, an instantaneous cadence value is calculated in real time without the need for measuring over the unit time.

The speed meter 208 is configured to measure a speed of the electric bicycle 200. The speed meter 208 comprises a magnet portion and a measurement portion. The magnet portion is placed on a spoke of a wheel (not shown) of the electric bicycle 200 at a radial position from a centre of the wheel. The measurement portion is placed on a frame of the electric bicycle 200 such that the measurement portion is aligned with the magnet portion once every rotation. The measurement portion determines a rotation period for a rotation of the wheel. The rotation period is then be converted into a rotational speed by dividing the unit time by the rotation period. With a known radius of the wheel, the speed may be calculated by multiplying the rotational speed by the perimeter of the wheel. Accordingly, an instantaneous speed is calculated in real time without the need for measuring over the unit time.

The battery 210 is configured to provide the electric motor of the electric bicycle 200 with electric energy, which the electric motor converts into mechanical energy in order to rotate the pedals. Accordingly, the battery 210 indirectly contributes to the cadence and speed of the electric bicycle 200. The battery 210 comprises a battery State of Health (SoH), indicative of a condition of the battery. When the battery 210 is manufactured, the SoH is ideally 100%. However, the SoH will decrease over time and use. The SoH is determined based on the voltage of the battery. In addition, the battery 210 comprises a battery State of Charge (SoC), indicative of a level of charge of the battery 210 relative to a capacity of the battery 210.

The feedback device 212 is operable to display a graphical user interface (GUI).

Figure 3:
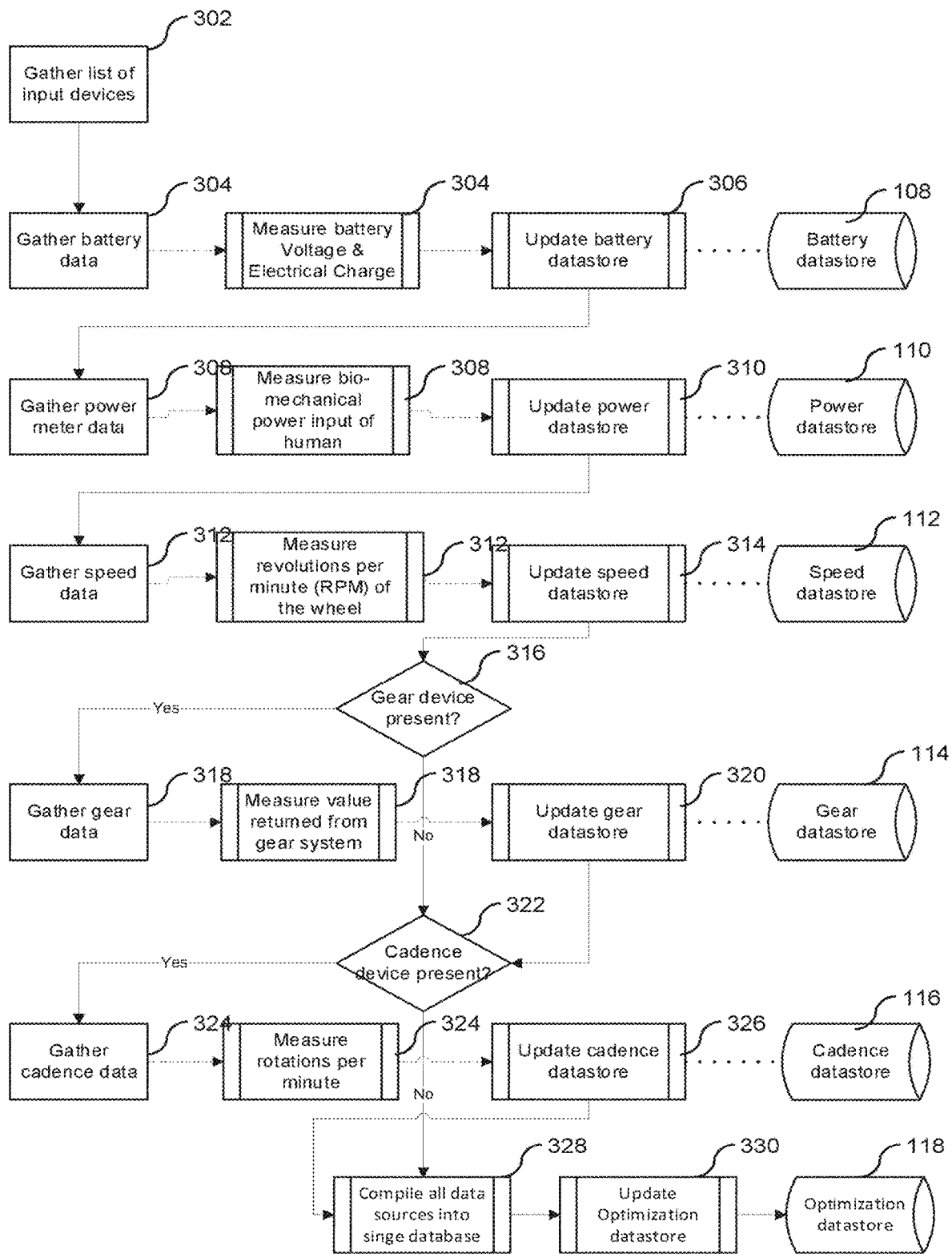
FIG. 3 is a flow diagram showing an in use method of gathering data from the electric bicycle of FIG. 2 using the power optimization system of FIG. 1.

FIG. 3 is a flow diagram 300 showing an in use method of gathering data from the electric bicycle 200 of FIG. 2 using the power optimization system of FIG. 1.

In a first step 302 of the method 300, the processor 102 determines which input devices are available. In the present embodiment, the electric bicycle 200 comprises the gear 202, the power meter 204, the cadence meter 206, the speed meter 208, and the battery 210. Accordingly, the processor 102 determines that the available input devices are: a voltmeter 120, an electrometer 130, a power meter 204, a cadence meter 206, and a speed meter 208.

At step 304, the processor 102 gathers battery data from the battery 210. That is, the processor 102 measures a voltage of the battery 210 via the voltmeter 120. The processor 102 also measures an electrical charge of the battery 210 via the electrometer 130.

At step 306, the processor 102 updates the battery datastore 108. To do this, the processor 102 sends the voltage and the electrical charge to the cloud based server 104. The voltage and the electrical charge are then stored within the battery datastore 108. Alongside the voltage and the electrical charge, the processor 102 also sends a voltage timestamp and a charge timestamp, representative of a clock time at which the voltage and electrical charge measurements occurred. The clock time is provided by the clock 103.

At step 308, the processor 102 gathers power meter data from the power meter 210. That is, the processor 102 measures a bio-mechanical power input from the user. The bio-mechanical power input is a magnitude of power provided by the user to the electric bicycle 200. This power is provided via the pedals.

At step 310, the processor 102 updates the power datastore 110. To do this, the processor 102 sends the bio-mechanical power input to the cloud based server 104. The bio-mechanical power input is then stored within the power datastore 110. Alongside the bio-mechanical power input, the processor 102 also sends a bio-mechanical power input timestamp, representative of a clock time at which the bio-mechanical power input measurement occurred. The clock time is provided by the clock 103.

At step 312, the processor 102 gathers speed data from the speed meter 208. The speed data represents an instantaneous speed of the electric bicycle 200. As discussed previously, the speed meter 208 determines a rotation period for a rotation of a wheel of the electric bicycle 200. The rotation period is then converted into a rotational speed by dividing the unit time by the rotation period. The rotational speed is then multiplied by a perimeter of the wheel to calculate a speed of the electric bicycle 200. Accordingly, an instantaneous speed is calculated in real time without the need for measuring over the unit time (e.g. a minute).

At step 314, the processor 102 updates the speed datastore 112. To do this, the processor 102 sends the instantaneous speed to the cloud based server 104. The instantaneous speed is then stored within the speed datastore 112. Alongside the instantaneous speed, the processor 102 also sends a speed timestamp, representative of a clock time at which the speed data measurement occurred. The speed is assumed to remain substantially constant throughout a single rotation of the wheel. Therefore, the speed timestamp corresponds to a start of the rotation of the wheel. The clock time is provided by the clock 103.

At step 316, the processor 102 determines that the gear 202 is present. In case the processor 102 determines that the gear 202 is not present, then steps 318 and 320 of the method 300 are not carried out.

At step 318, the processor 102 gathers a gear value from the gear 202. The gear value represents a current gear setting of the electric bicycle 200. For example, the processor 102 communicates with the gear processor of the gear 202 and determines that the gear 202 is in the first gear setting.

At step 320, the processor 102 updates the gear datastore 114. To do this, the processor 102 sends the gear value to the cloud based server 104. The gear value is then stored within the gear datastore 114. Alongside the gear value, the processor 102 also sends a gear timestamp, representative of a clock time at which the gear value measurement occurred. The clock time is provided by the clock 103.

At step 322, the processor 102 determines that the cadence meter 206 is present. In case the processor 102 determines that the cadence meter 206 is not present, then steps 324 and 326 of the method 300 are not carried out.

At step 324, the processor 102 gathers cadence data from the cadence meter 206. The cadence data represents an instantaneous cadence of the pedals of the electric bicycle 200. As discussed previously, the cadence meter 206 determines a rotation period for a rotation of a pedal of the electric bicycle 200. The rotation period is then converted into a cadence value by dividing the unit time by the rotation period. Accordingly, an instantaneous cadence value is calculated in real time without the need for measuring over the unit time (e.g. a minute).

At step 326, the processor 102 updates the cadence datastore 116. To do this, the processor 102 sends the instantaneous cadence value to the cloud based server 104. The instantaneous cadence value is then stored within the cadence datastore 116. Alongside the instantaneous cadence value, the processor 102 also sends a cadence timestamp, representative of a clock time at which the cadence measurement occurred. The cadence value is assumed to remain substantially constant throughout a single rotation of the pedal. Therefore, the cadence timestamp corresponds to a start of the rotation of the pedal. The clock time is provided by the clock 103.

In the present example, all time stamps comprise the same clock time, such that the measurements occur at the same time.

At step 328, the processor 102 combines each unique configuration of input data having a time stamp corresponding to the same clock time. That is, the processor 102 combines each unique configuration of: the voltage of the battery 210 (provided by the voltmeter 120), the electrical charge of the battery 210 (provided by the power meter 130), the bio-mechanical power input provided by the power meter 210, the speed data provided by the speed meter 208, the gear value provided by the gear 202, and the instantaneous cadence provided by the cadence meter 206. In the present example, since there are six measurements, the number of possible configurations or permutations is 720.

At step 330, the processor 102 updates the optimization datastore 118. To do this, the processor 102 sends the unique configurations to the cloud based server 104. The unique configurations are then stored within the optimization datastore 118.

Figure 4:
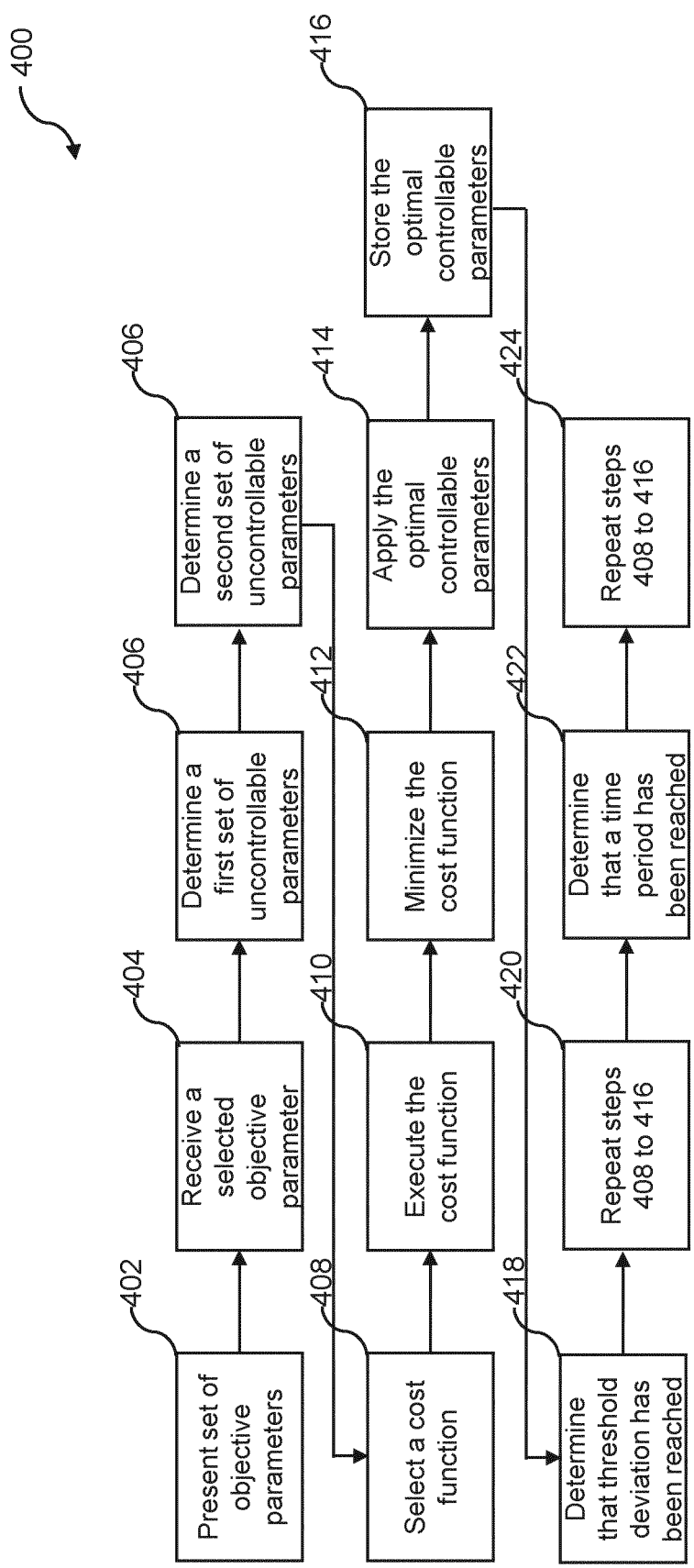
FIG. 4 is a flow diagram showing an in use method providing a user of the electric bicycle of FIG. 2 with an optimal power solution using the power optimization system of FIG. 1.

Turning now to FIG. 4, a flow diagram 400 shows an in use method 400 providing a user of the electric bicycle 200 of FIG. 2 with an optimal power solution using the power optimization system of FIG. 1.

At step 402 of the method 400, the processor 102 causes for display on the feedback device 212, a pre-defined set of objective parameters. The set of objective parameters includes minimised battery consumption; minimised biomechanical power input; and minimised journey time. Each of the objective parameters has a corresponding pre-defined cost function stored on the optimization datastore 118.

At step 404, the processor 102 receives a selected objective parameter from the set of objective parameters following a user selecting the objective parameter. In the present example, the selective objective parameter is a minimized journey time.

At step 406, the processor 102 determines a first set of uncontrollable parameters. The first set of uncontrollable parameters include: a wind resistance opposing the motion of the user, a weight of the user, a road surface material, traffic conditions, weather conditions, and traffic light signals. The processor also stores the first set of uncontrollable parameters on the optimization datastore 118, along with an uncontrollable parameter time stamp. The processor 102 also continuously determines a second set of uncontrollable parameters and stores the second set on the optimization datastore 118. The uncontrollable parameters are determined based on the parameters stored in the battery datastore 108, power datastore 110, speed datastore 112, gear datastore 114, and cadence datastore 116.

At step 408, the processor 102 selects a cost function from the set of pre-defined cost functions. The selection is based on, and corresponds to, the selected objective parameter. The cost function represents the system mathematically and contains both the first set of uncontrollable parameters and each of the unique controllable parameter configurations. The unique controllable parameter configurations are the unique configurations of input data stored in the optimization datastore 118, as determined in step 328 of the method 300. That is, the controllable parameters are parameters which may be controlled either by the system or by the user. In the present example, the cost function is associated with the minimized journey time.

At step 410, the processor 102 executes the cost function. The cost function determines a "cost" associated with performing the selected objective parameter, taking into account the first set of uncontrollable parameters and the controllable parameters. Accordingly, in the present example, the cost function determine a cost associated with minimizing journey time, taking into account the uncontrollable parameters and the controllable parameters. At this stage, the controllable parameters are not optimized.

At step 412, the processor 102 uses linear optimization (or linear programming) to minimize the cost function. As a result, the minimized cost function outputs a set of optimal controllable parameters values that minimizes the cost associated with the objective parameter.

At step 414, the processor 102 applies the optimal controllable parameters. In particular, the processor 102 implements automatic optimal controllable parameters, such as causing the battery to output an optimal magnitude of power to the motor 214, thereby influencing the speed of the electric bicycle 200. The processor 102 also causes the gear 202 to adjust to an optimal gear setting. The processor 102 also alerts the user to manual optimal controllable parameters by causing the feedback device 212 to alert the user with an optimal cadence. The user may then apply the optimal cadence by either increasing or decreasing their bio-mechanical power output. The processor 102 also outputs a clock time, measured via the clock 103.

At step 416, the processor 102 stores, on the optimization datastore 118, the optimal controllable parameters associated with the first set of uncontrollable parameters. The optimal controllable parameters are stored with an optimal controllable parameter time stamp which may be used to determine that the optimal controllable parameters correspond to the first set of uncontrollable parameters and the objective parameter.

At step 418, the processor 102 determines that at least one uncontrollable parameter from the second set of uncontrollable parameters has reached a threshold deviation from the corresponding uncontrollable parameter in the first set of uncontrollable parameters. For example, if the gradient (or incline) of the road in the first set of uncontrollable parameters is 8% and the gradient of the road in the second set of uncontrollable parameters is 9%, the processor will determine that the threshold deviation has been reached if the threshold deviation is 1%.

At step 420, steps 408 to 416 are repeated using the second set of uncontrollable parameters instead of the first set of uncontrollable parameters, thereby outputting a new set of optimal controllable parameters.

At step 422, the processor 102 determines that a predetermined time period has been reached. That is, the processor 102 determines that the predetermined time period has elapsed since the output of the clock time in step 414. The predetermined time period may be, for example, 60 seconds.

At step 424, steps 408 to 416 are repeated using the second set of uncontrollable parameters instead of the first set of uncontrollable parameters, thereby outputting a new set of optimal controllable parameters.

At step 406, the processor 102 may also determine that the first set of uncontrollable parameters matches a historic set of uncontrollable parameters. The processor 102 may also determine that the objective parameter matches a historic objective parameters associated with the historic set of uncontrollable parameters by determining that the time stamp associated with the historic objective parameter matches the time stamp associated with the historic set of uncontrollable parameters. In this case, the processor 102 skips steps 408 to 416. The processor 102 instead applies a historic set of optimal characteristics having a time stamp matching the time stamps associated with the historic objective parameter and the historic set of uncontrollable parameters.

Although the server is described as being cloud-based, it is to be understood that the server may be located alternatively, such as centrally on a private network or locally on a local area network. Furthermore, although a smart phone and a smart watch have been given as examples of a smart device, it is to be understood that the smart device may be any device capable of communicating with the processor. In addition, the processor may be physically or wirelessly connector the smart device. The smart device may communicate with the processor via any suitable means such as Wi-Fi.

Alternative electric bicycles are envisaged, for example wherein the electric motor rotates the wheels of the electric bicycle. Further, the cadence meter is to be understood as any device suitable for measuring cadence. Alternate means of measuring speed are envisaged, for example GPS. Additional battery State of Health parameters may be envisaged, such as internal resistance, capacity, self-discharge, ability to accept a charge, number of charge-discharge cycles, age of the battery, temperature of the battery, and total energy charged and discharged. Multiple rotations may be measured in order to increase the accuracy of the speed measurements. The electric gear may alternatively be a mechanical gear. Further objective parameters may be envisaged. Further objective parameters may be envisaged. Further uncontrollable parameters may also be envisaged, such as the availability of a cycle lane.

The invention claimed is:

1. A micro-mobility vehicle electrical power optimization system generating and applying a set of optimal characteristics, the optimal characteristics being optimal controllable operating settings for the micro-mobility vehicle, the system comprising a processor operable to carry out the steps of:
receiving, from an input from a user of the micro-mobility vehicle, an objective parameter;
recognising, from the micro-mobility vehicle, a set of input devices;
determining, from the set of input devices, a set of input device metrics;
storing, on a datastore, the set of input device metrics;
determining the set of optimal characteristics based on:
the objective parameter; and
the set of input device metrics; and
applying the optimal characteristics, thereby optimizing power parameters of the set of input devices of the micro-mobility vehicle,
wherein the set of optimal characteristics is determined by:
selecting an optimization function based on the objective parameter, the optimization function mathematically representing a micro-mobility vehicle system and containing both an uncontrollable parameter and a plurality of unique controllable parameter configurations, the unique controllable parameter configurations being formed by combining input device metrics measured at a same time stamp, the uncontrollable parameter being an environmental parameter,
determining the uncontrollable parameter,
executing the optimization function, and
optimizing the optimization function, thereby outputting the set of optimal characteristics, and
wherein the optimization function is based on:
the objective parameter,
the uncontrollable parameter, and
the set of input device metrics.

2. The system of claim 1, wherein the optimization function is a cost function and the cost function is optimized by minimizing the cost function.

3. The system of claim 1, wherein the objective parameter is one or more selected from the range of:
a maximum battery capacity depletion;
a minimum journey time;
a maximum heart-rate;
a minimum battery drain;
a target heart rate;
a target maximum speed; and
a minimum bio-mechanical power input.

4. The system of claim 1, wherein the uncontrollable parameter is one more selected from the range of:
a wind resistance opposing the motion of the user;
a weight of the user;
a road surface material;
a traffic condition;
a weather condition; and
a traffic light status.

5. The system of claim 1, wherein the datastore further comprises:
a historic objective parameter having an objective parameter timestamp;
a historic uncontrollable parameter having an uncontrollable parameter timestamp;
a historic input device metric having an input device metric timestamp; and
a historic optimal characteristic having an optimal characteristic timestamp;
wherein the objective parameter timestamp, the historic uncontrollable parameter timestamp and the optimal characteristic timestamp are the same, indicating that they correspond to the same historic activity.

6. The system of claim 5, wherein the set of optimal characteristics is determined by:
determining that the uncontrollable parameter matches the historic uncontrollable parameter;
determining that the objective parameter matches the historic objective parameter; and
outputting the optimal characteristic as the historic optimal characteristic.

7. The system of claim 1, wherein the set of input devices comprises one or more selected from the range of:
a battery;
a power meter; and
a speed meter.

8. The system of claim 7, wherein the set of input device metrics comprises:

a state of charge held in the battery;
a bio-mechanical power input of the user; and
a speed of the micro-mobility vehicle;
wherein the state of charge is measured by an analogue-to-digital convertor driver operatively connected to the battery;
wherein the bio-mechanical power input is determined from the power meter; and
wherein the speed is determined from the speed meter.

9. The system of claim 7, wherein the set of input devices further comprises one or more selected from the range of:
a gear input device;
a cadence meter;
an air flow meter; and
a heart rate monitor.

10. The system of claim 9, wherein the gear input device is an electronic gear.

11. The system of claim 10, wherein the set of input device metrics further comprises:
a gear state of the electronic gear;
a cadence;
an air flow; and
a heart rate;
wherein the gear state is output by the electronic gear;
wherein the cadence is determined from the cadence meter;
wherein the air flow is determined from the air flow meter; and
wherein the heart rate is determined from the heart rate monitor.

12. The system of claim 1, further comprising a clock.

13. The system of claim 12, wherein the set of input device metrics comprise a clock time measured from the clock.

14. The system of claim 1, wherein the datastore is a time-series datastore.

15. The system of claim 1, wherein the processor is further operable to cause for display on an indication device, the optimal characteristics on a feedback device of the micro-mobility vehicle.

16. The method of claim 2, wherein cost function is minimized with linear optimization.

17. A method for generating and applying a set of optimal characteristics, the optimal characteristics being optimal controllable operating settings for a micro-mobility vehicle, the method comprising:
receiving, by a processor, from an input from a user of the micro-mobility vehicle, an objective parameter;
recognising, by the processor, from the micro-mobility vehicle, a set of input devices;
determining, by the processor, from the set of input devices, a set of input device metrics;
storing, by the processor, on a datastore comprising a set of predetermined metrics, the set of input device metrics;
determining, by the processor, the set of optimal characteristics based on:
the objective parameter; and
the set of input device metrics; and
applying, by the processor, the optimal characteristics, thereby optimizing power parameters of the set of input devices of the micro-mobility vehicle,
wherein the set of optimal characteristics is determined by:
selecting, by the processor, an optimization function based on the objective parameter, the optimization function mathematically representing a micro-mobility vehicle system and containing both an uncontrollable parameter and a plurality of unique controllable parameter configurations, the unique controllable parameter configurations being formed by combining input device metrics measured at a same time stamp,
determining, by the processor, an uncontrollable parameter, the uncontrollable parameter being an environmental parameter
executing, by the processor, the optimization function,
optimizing, by the processor, the optimization function, thereby outputting the set of optimal characteristics, and
wherein the optimization function is based on:
the objective parameter,
the uncontrollable parameter, and
the set of input device metrics.

18. The method of claim 17, wherein the uncontrollable parameter is one or more selected from the range of:
a wind resistance opposing the motion of the user;
a weight of the user;
a road surface material;
a traffic condition;
a weather condition; and
a traffic light status; and/or wherein the set of input devices comprises one or more of:
a battery;
a power meter;
a speed meter;
a gear input device;
a cadence meter; and
an air flow meter; and/or wherein the objective parameter is one or more of:
a maximum battery capacity depletion;
a minimum journey time;
a maximum heart-rate;
a minimum battery drain;
a target heart rate;
a target maximum speed; and
a minimum bio-mechanical power input.

19. The method of claim 17, wherein the set of input device metrics comprises one or more of:
a state of charge held in the battery;
a bio-mechanical power input of the user;
a speed of the micro-mobility vehicle;
a gear state of the electronic gear;
a cadence; and
an air flow;
wherein the bio-mechanical power input is determined from the power meter;
wherein the speed is determined from the speed meter
wherein the cadence is determined from the cadence meter; and
wherein the air flow is determined from the air flow meter.

* * * * *